United States Patent
Durai et al.

(10) Patent No.: US 10,904,403 B1
(45) Date of Patent: Jan. 26, 2021

(54) METHODS, SYSTEMS, AND SCANNERS FOR SCANNING BOUND DOCUMENTS WITH VARYING LIGHT INTENSITY

(71) Applicant: XEROX CORPORATION, Norwalk, CT (US)

(72) Inventors: Shankar Durai, Vellore District (IN); Saranraj Velayutham, Thanjavur (IN); Ramanathan Arunachalam, Chennai (IN); Anandha Kumar, Thuraiyur (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/511,325

(22) Filed: Jul. 15, 2019

(51) Int. Cl.
*H04N 1/04* (2006.01)
*H04N 1/00* (2006.01)
*H04N 1/32* (2006.01)
*G06T 5/00* (2006.01)
*G06T 7/12* (2017.01)
*H04N 1/409* (2006.01)

(52) U.S. Cl.
CPC ......... *H04N 1/00748* (2013.01); *G06T 5/002* (2013.01); *G06T 7/12* (2017.01); *H04N 1/32464* (2013.01); *H04N 1/4092* (2013.01); *G06T 2207/30176* (2013.01)

(58) Field of Classification Search
CPC ........... H04N 1/00748; H04N 1/32464; H04N 1/4092; H04N 1/02865; G06T 7/12; G06T 5/002; G06T 2207/30176
USPC ............ 358/475, 509, 497, 474; 355/67–70; 250/205, 216
See application file for complete search history.

(56) References Cited

U.S. PATENT DOCUMENTS

| | | | | |
|---|---|---|---|---|
| 4,980,720 A * | 12/1990 | Siegel | .................... | G03G 15/04 355/25 |
| 5,221,974 A * | 6/1993 | Kusumoto | ......... | H04N 1/02409 358/406 |
| 6,587,227 B1 * | 7/2003 | Fullerton | ........... | H04N 1/00811 355/25 |
| 6,603,580 B1 * | 8/2003 | Taillie | .................... | H04N 1/047 358/474 |
| 7,253,427 B2 * | 8/2007 | Spears | ................. | G03G 15/043 250/559.27 |
| 8,274,712 B2 * | 9/2012 | Sheng | ................ | H04N 1/02865 358/474 |
| 8,427,713 B2 * | 4/2013 | Yabuta | ................. | H04N 1/1017 358/474 |
| 8,625,170 B2 * | 1/2014 | Imoto | .................. | H04N 1/0285 358/474 |

(Continued)

*Primary Examiner* — Cheukfan Lee

(57) ABSTRACT

The present disclosure discloses methods, systems and scanners for scanning document with varying light intensity. The method includes receiving a bound document positioned on an upper surface of a platen, for scanning, wherein the bound document, when opened for scanning, includes a flat region and a curved region. A distance between the bound document positioned on the platen and a contact image sensor (CIS) is continuously monitored and measured, to detect the curved region. Upon detection, a control command is generated to vary the intensity of the light to be emitted from a light source. Then, light with varying intensity is emitted for illuminating the curved region of the bound document. Thereafter, the light reflected from the bound document is received for capturing an image of the bound document. Finally, a digital version of the bound document is generated without any dark strip or without any distortion.

22 Claims, 12 Drawing Sheets

(56) References Cited

U.S. PATENT DOCUMENTS

| | | | |
|---|---|---|---|
| 8,760,731 B2* | 6/2014 | Wilsher | H04N 1/40 358/475 |
| 2006/0065858 A1* | 3/2006 | Spears | H04N 1/1017 250/559.29 |
| 2007/0070166 A1* | 3/2007 | Mikami | B41J 2/45 347/130 |
| 2008/0055676 A1* | 3/2008 | Sugeta | H04N 1/4076 358/498 |
| 2008/0174835 A1* | 7/2008 | Lee | H04N 1/0285 358/497 |
| 2009/0128868 A1* | 5/2009 | Sheng | H04N 1/484 358/509 |
| 2009/0290200 A1* | 11/2009 | Yoshimoto | H04N 1/02865 358/475 |
| 2009/0316223 A1* | 12/2009 | Takeuchi | H04N 1/1013 358/474 |
| 2012/0002253 A1* | 1/2012 | Nagamochi | H04N 1/484 358/509 |
| 2014/0218772 A1* | 8/2014 | Koshimizu | H04N 1/00013 358/461 |
| 2015/0116791 A1* | 4/2015 | Tochigi | H04N 1/40056 358/475 |
| 2015/0116792 A1* | 4/2015 | Inoue | H04N 1/00082 358/475 |
| 2015/0276384 A1* | 10/2015 | Saiki | G03G 15/55 356/620 |

* cited by examiner

METHODS, SYSTEMS, AND SCANNERS FOR SCANNING BOUND DOCUMENTS WITH VARYING LIGHT INTENSITY

TECHNICAL FIELD

The present disclosure relates generally to the field of scanning devices. In particular, the present disclosure relates to methods, systems and scanning devices for scanning bound documents with varying light intensity.

BACKGROUND

Many institutions, such as the Library of Congress, universities, bookstores, and private enterprises have vast collections of bound documents. Bound documents include not only books, but also periodicals, manuscripts, pamphlets, brochures, newspapers, manuals, and any other document having a bound edge. With the advent of improved imaging, storage, and distribution techniques, bound documents are nowadays converted into digital form to reduce the cost of storage, facilitate remote access, enable simultaneous access to multiple users, facilitate search and retrieval of information, and/or protect information in rare or out-of-print works from loss or destruction. The bound documents are converted into digital form with the help of a photocopier device or a document scanner. The scanning of the bound documents such as books always creates a black strip at the center of the copy because of the curvature of the book in the center region. Several scanners are available in the market for scanning bound documents or other documents. One such example is a flat-bed platen scanner.

The traditional flat-bed platen scanner 100 scans bound documents such as a book 112 in a face-down position as shown in FIG. 1. When the book 112 is in face-down position, a scan head 104 disposed beneath and in the proximity of a lower surface of the platen 102-L. The scan head 104 moves across, and in proximity to, the lower surface of the platen 102-L to scan the book 112 placed on an upper surface of the platen 102-U. The scan head 104 typically includes a light source 106 to illuminate the book 112 and, a contact image sensor (CIS) 108 to receive light reflected from the book 112 during the scanning process. The contact image sensor 108 is precisely calibrated to detect light reflected from the book surface at a particular intensity. However, during book 112 scanning as the sensor 108 travels along the entire length of the book 112, some of the light is not reflected back to the sensor 108, at the center region of the book 112. Because of the curvature of the book surface, some of the light misses the image sensor 108 and because of the increase in distance of book surface from the sensor, the intensity (shown through lines marked 101) of the light reaching the image sensors 108 is less as shown in FIG. 1. This ultimately leads to darker image reproduction (or black strip at the center region) as well as distortion. Such an effect is illustrated in FIG. 2, marked as 117. The effect occurs due to the distance of the center region of the book 112 from the platen 102 as illumination required for such distance is outside a defined specification of the light source disposed for illumination of the book 112.

To avoid this, the user sometimes has to push the book hard on to the platen to decrease the gap between the book surface and the sensor. The application of user's force to the centre region of the book may help but such force sometimes can damage the center region of the book or even the entire book.

Therefore, there is a need for improved devices, systems and methods to be able to scan or copy bound documents without dark image reproduction, without distortion and/or to overcome above mentioned concerns.

SUMMARY

According to aspects illustrated here, a scanner for scanning a bound document is disclosed. The scanner includes a platen having an upper surface and a lower surface, wherein on the upper surface of the platen, a bound document is positioned for scanning, and wherein the bound document, when opened for scanning, includes a flat region and a curved region. The scanner includes a scan head disposed beneath and in proximity of the lower surface of the platen, the scan head moves across, and in proximity to, to the lower surface of the platen so as to scan the bound document placed on the upper surface of the plate. The scan head includes a light source to emit light for illuminating the bound document; a contact image sensor (CIS) to receive the light reflected from the bound document for capturing an image of the bound document, and wherein the scan head further includes at least one distance sensor to continuously monitor and measure a distance between the bound document and the CIS to detect the curved region of the bound document; and a controlling processor, coupled to the at least one distance sensor, to generate a control command to vary the intensity of the light to be emitted from the light source, upon detection of the curved region of the bound document in order to capture a complete image of the bound document at the curved region. The scan head further includes an image processor for generating a digital version of the bound document without any dark strip or without any distortion.

A method for scanning a bound document is disclosed. The method includes: receiving a bound document positioned on an upper surface of a platen, for scanning, wherein the bound document, when opened for scanning, includes a flat region and a curved region; continuously monitoring and measuring a distance between the bound document positioned on the platen and a contact image sensor (CIS), to detect the curved region of the bound document; upon detection, generating a control command to vary the intensity of the light to be emitted from a light source, upon detection of the curved region of the bound document; emitting light with varying intensity for illuminating the curved region of the bound document; receiving the light reflected from the bound document for capturing an image of the bound document; and generating a digital version of the bound document.

According to further aspects, a method for scanning a bound document is disclosed. The method includes: receiving a bound document on a platen of a scanner for scanning, the bound document includes a flat region and a curved region, wherein the scanner includes a light source having outer arrays of light emitting devices and inner arrays of light emitting devices; initiate scanning of the bound document; activating the outer arrays to emit light from the light source to illuminate the bound document, the outer arrays are activated during the entire scanning operation; while scanning, continuously monitoring and measuring distance between the bound document and a contact image sensor, to detect the curved region; upon detection of the curved region, generating a control command to increase the intensity of the light source at or along the curved region; in addition to the activated outer arrays, activating the inner arrays of the light source to increase the intensity of light in the curved region of the bound document, the inner arrays are activated only when the curved region is detected; receiving light reflected from the bound document to capture a complete image of the bound document; and generating a digital version of the bound document.

According to additional aspects, a light source is disclosed. The light source includes outer arrays having a plurality of light emitting devices, wherein the outer arrays are activated during the entire scanning operation of a bound document, wherein the bound document having a flat region and a curved region; and inner arrays having a plurality of light emitting devices, wherein the inner arrays are activated only during scanning of the curved region of the bound document, wherein the inner arrays are activated to increase intensity of light in the curved region of the bound document in order to increase the reach through the curved region of the bound document.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

FIG. 1 shows a known scanning process in operation, while

FIG. 3 shows a physical scanner in context of the present disclosure, while

FIG. 10 shows a front view of the scanner in operation, while

DESCRIPTION

Figure 2:
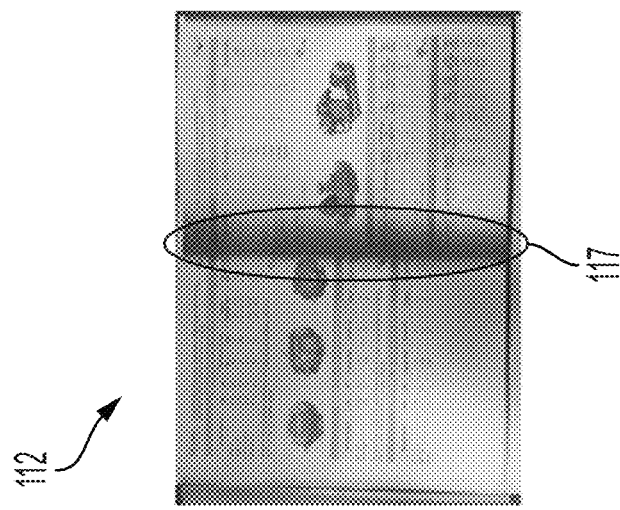
FIG. 2 illustrates a dark image reproduction, resulted due to the known scanning process as shown in FIG. 1.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples than just provided below.

The "scanner" refers to a single or a combination of multiple devices to perform one or more functions, but not limited to, scanning, printing, copying, imaging, and so forth. The scanner includes software, hardware, firmware, or combination thereof. The scanner creates a digital document corresponding to a paper document (i.e., a printed form). In context of the present disclosure, the scanner scans a document such as a bound document and creates a digital version of the bound document without any dark image reproduction in a center region of the bound document and/or without any distortion. To this end, the scanner includes one or more components such as distance sensors, one or more light sources, and a controlling processor. The scanner additional includes a platen, a scan head, a contact image sensor, an image processor and other components for implementing the present disclosure and the same will be discussed below in greater detail.

The term "document" refers to a paper document, which can be in a physical form, such as printed on paper including information in form of text, graphics and/or image. The document can be any bound document such as a bound book. Other examples include periodicals, manuscripts, pamphlets, brochures, newspapers, manuals, and any other document having curvature in a center region of the bound document. The bound document has a flat region and a curved region typically in the center of the bound document. The curved region can also be referred to as a center region.

The term "digital document" refers to a document in a virtual or software form (embodied in a software file) of the physical form. The digital document is generated by the scanner. The scanner receives the bound document as an input and generates the digital document corresponding to the bound document as the output. In other words, the scanner generates the digital version of the bound document.

The term "light sources" refer to sources of light whose intensity can be varied based on a signal received from the controlling processor. The light sources can include any light emitting devices such as light emitting diodes without limiting the scope of the disclosure.

The term "image sensor" refers to a contact image sensors (CIS) which is typically used in flat-bed platen scanners and is almost in direct contact with the bound document to be scanned. The CIS typically includes a linear array of detectors, covered by focusing lenses.

The term "distance sensor" refers to a proximity sensor. The proximity sensor is a sensor able to detect the presence of nearby objects such as bound books, without any physical contact. The proximity sensor often emits an electromagnetic field or a beam of electromagnetic radiation (infrared, for instance), and looks for changes in the field or return signal. Examples of proximity sensor include but not limited to an inductive proximity sensor, a capacitive proximity sensor, and a photoelectric sensor.

The term "controlling processor" refers to a processor that controls or adjusts intensity of the light sources based on a signal from the distance sensor. The controlling processor receives a signal from the distance sensor, processes the signal, and sends appropriate signals to the light sources for varying (includes increasing and/or decreasing) illumination intensity. For example, the controlling processor increases the illumination intensity upon detection of the curved region. The controlling processor decreases the illumination intensity when an end of the curved region is detected. The controlling processor may be implemented as a combination of hardware and programming (for example, programmable instructions) to implement one or more functionalities.

Existing Scanner Solutions

Figure 1:
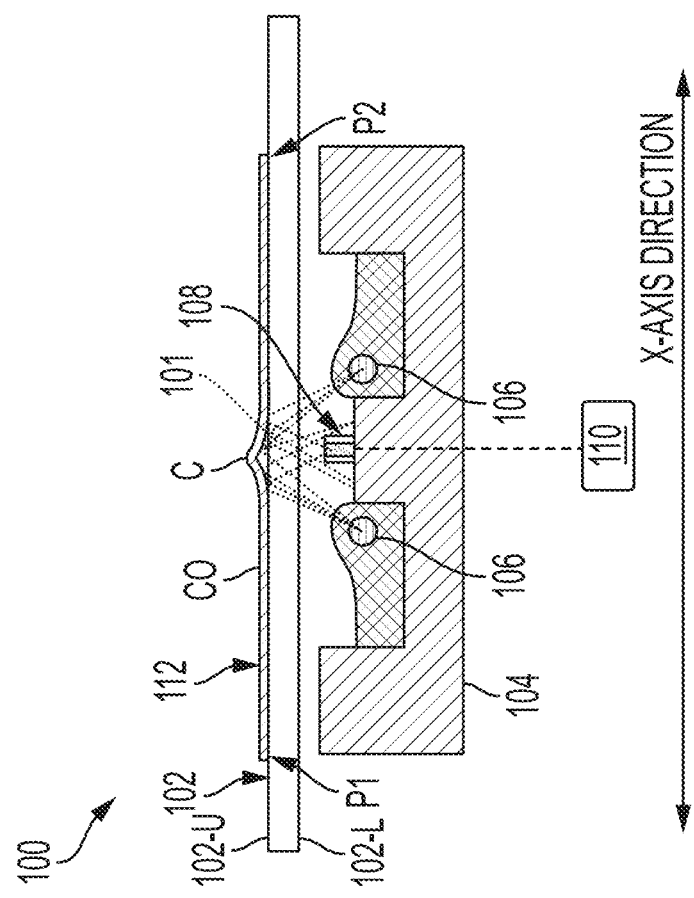

FIG. 1 shows a schematic side view of an existing scanner 100 in operation according to known solutions in the art.

Typically, the scanner 100 includes a housing (although not shown) which supports a flat transparent platen 102. The platen 102 is defined by an upper surface 102-U and a lower surface 102-L. The scanner 100 further includes a scan head 104 which moves in X-axis direction across the lower surface 102-L of the platen 102 to perform the scanning process. The scan head 104 is guided by a scan head track (not shown in figures) and is moved along the track by a motive element (not shown, but typically includes a drive belt or cable which pulls the scan head 104 in the x-axis direction). The scan head 104 includes light sources 106 and a reflected light receptor, i.e., a contact image sensor (CIS) 108. The CIS 108 is coupled to an image processor 110 which is programmed to receive the images from the CIS 108 and to create a copy of the original bound document (i.e., in a digital form).

In operation, the scanner 100 scans a bound document such as a book 112. The book 112 has a flat region and a center region having a curvature/curve in the center region. The curvature or the curve "C" can be clearly seen in FIG. 1. For simplicity, page 1 marked as "P1" and page 2 "P2" of the book 112 are shown. While scanning, the book 112 is placed on the upper surface 102-U of the platen 102. The bound book 112 is placed on the platen 102 so as to present pages "P1" and "P2" to the scan head 104 as the scan head 104 moves in X-axis direction across the lower surface 102-L of the platen 102. The bound book 112 includes a cover "CO", which defines a curve "C" (i.e., curved region) of the bound book 112, where the pages of the bound book 112 are joined to the cover "CO". As can be seen in FIG. 1, the curve "C" of the bound book 112 forces the pages "P1" and "P2" and to curve upwards, away from the upper surface 102-U of the platen 102 in the curved region "C." As further can be seen in FIG. 1, the portion of the pages "P1" and "P2" of the bound book 112 in the curved region "C" is not oriented in a parallel arrangement to the upper surface 102-U of the platen 102. Accordingly, light reflected from the portion of the pages "P1" and "P2" in the curved region "C" is likely not be reflected to the CIS 108, resulting in loss of scanned image/data from the curved region "C." Further, since the portion of the pages "P1" and "P2" in the curved region "C" is moved away from the platen 102, the illumination of the pages by the light sources 106 in the curved region "C" may not be sufficient to allow a decent image to be captured. And the problem is particularly acute for very thick bound documents, and more so when the text on the pages "P1" and "P2" to be imaged intrudes deep into the curved region "C." Even for relatively thin bound documents, if the cover "CO" and curved region "C" are quite rigid, then text or images in the curved region "C" are not imaged completely or may be poorly imaged.

Scanned images of bound documents often have distortions generated by the scanning process. Depending on the bound book 112 orientation relative to the scanning direction when it lays on the platen 102 and the elevation of the bound book 112 curved region "C" above the platen 102, the distortion appears. As shown in FIG. 2, when the bound book 112 curved region is above the platen 102, a scanned image of the bound book 112 usually includes a dark region marked as 117 and has shadows ("shadow distortion") appearing in the scanned image close to the curved region.

One approach to solve this problem is the application of user's force to the curved region "C" of the bound document 112 to ensure that the curved region "C" come within the light source's illumination range. But such force can damage the curved region "C" of the bound document 112 or even the entire bound document 112. This is obviously undesirable since it will result in permanent damage to the bound document 112.

To overcome the above mentioned problems, the present disclosure is presented. The present disclosure discloses methods and systems for scanning bound documents such that the output scanned document has no dark region and is without distortion. To this end, the system includes a distance sensor, light sources and a controlling processor. The light sources include light sources whose intensity can be adjusted by a command from the controlling processor. The system further includes a platen, a contact image sensor, and an image processor. The entire setup is placed on a supporting platform below the platen and can be moved along the entire length of the bound document. The system addresses the above mentioned problems by using the distance sensor to measure the distance of the bound document from the image sensor and accordingly adjusts the intensity of the light from the light sources. When a user places the bound document on the platen for copying, the distance sensor measures the distance between the bound document's face and the contact image sensor and based on the distance, intensity of the light source is controlled. The contact image sensor starts gathering image input from the reflected light and sends it to an image processor. As the supporting platform is moved along length of the bound document, the contact image sensor covers the whole area of the bound document. When the distance between the bound document's surface and the contact image sensor increases because of the curvature of the paper in the bound document, the distance sensor detects the increased distance and the controlling processor increases the intensity of the light from the light sources. This increase in intensity precisely offsets the loss of reflected light by the bound document curvature. As a result, the image sensor receives enough light reflected by the bound document's surface to create a detailed copy of the bound document without a dark black strip at the center region or without any distortion.

Exemplary Physical Scanner and its Working

Figure 3:
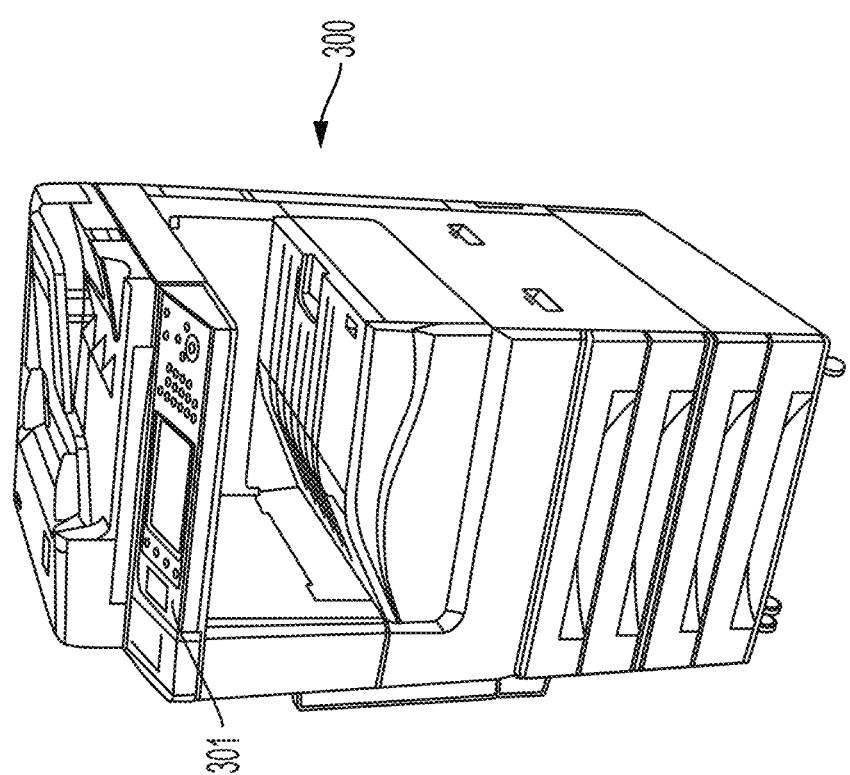
Figure 4:
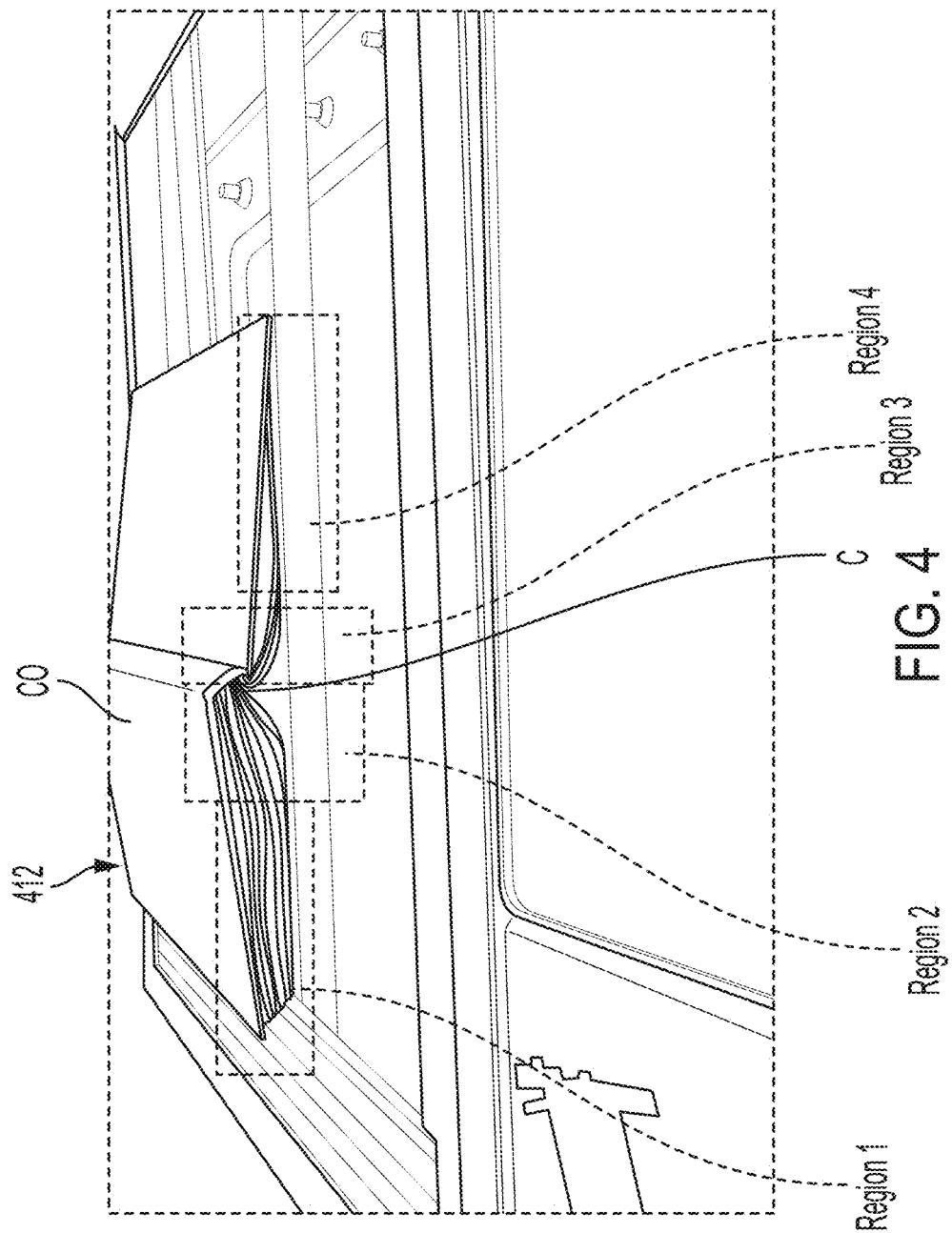
FIG. 4 shows a bound document placed on a platen of the scanner.
Figure 5:
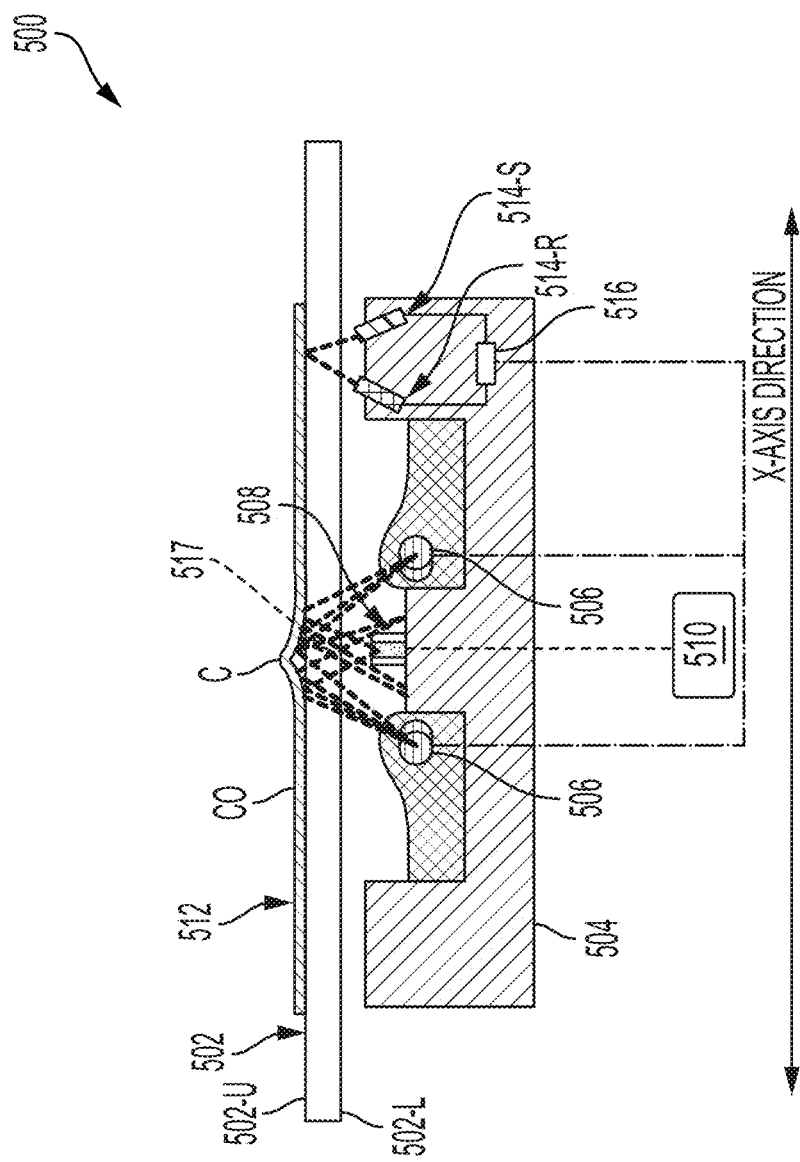
FIG. 5 shows the scanner in operation.

FIG. 3 illustrates an exemplary physical scanner 300 according to context of the disclosure, and the scanner 300 in operation is shown in FIG. 5. The scanner 300 is presented with some hardware and software enhancements to create a digital copy of a bound document with image quality enhancements. Such scanner 300 will further be described with reference to other figures. In place of the scanner 300, the present disclosure may include a multi-function device, a multi-function peripheral device, a photocopier or the like. Although, the scanner 300 shown in FIG. 3 is a standalone device, but the scanner 300 can be a part of any network as known or later developed network. As an example, the scanner 300 may be connected to computing devices, mobile devices, servers, or other devices via suitable networks. The scanner 300 may include functionalities of scanning, copying, imaging, etc. The scanner 300 receives an input in the form of a bound document (a printed version) such as a book 412 shown in FIG. 4. Various other examples of the bound document 412 include periodicals, manuscripts, pamphlets, brochures, newspapers, manuals, and any other document having curved regions. These are few examples; the disclosure can be implemented for any bound documents having a curved region.

As shown in FIG. 4, a bound document 412 is placed on a platen of the scanner 300. The bound document 412 includes a cover "CO," a flat region and a curved region "C." As clearly seen, when the distance between the bound document 412 and a scanning platform of the scanner 300 (i.e., a contact image sensor, although not visible) remains the same/constant, the region is defined as the flat region (marked as region 1). As move forward, the distance between the bound document 412 and the contact image sensor (although not visible) starts increasing, the region is defined as the curved region "C" (marked as region 2) and further where the distance starts decreasing, the region is defined as end of the curved region "C" (marked as region 3). After decreasing, the distance between the bound document 412 and the contact image sensor again remains constant, the region is again defined as flat region (marked as region 4).

Upon receiving the bound document 412, the scanner 300 scans the document 412 and generates a digital version of the bound document 412 as an output. In context of the current disclosure, the scanner 300 generates the digital version of the bound document 412 without any dark image reproduction in the curved region "C" of the bound document 412 and without any distortion. More structural and functional details of the scanner 300 are shown and discussed in conjunction with FIG. 5.

The proposed arrangement and internal working of the scanner 300 is shown in FIG. 5 (marked as 500) as an exemplary implementation. As shown, the scanner 300 includes a platen 502 (an upper surface 502-U and a lower surface 502-L), a scan head 504 having a contact image sensor (CIS) 508, and an image processor 510. In context of the current disclosure, the scanner 300 includes a distance sensor sender 514-S and receiver 514-R (collectively distance sensor 514), one or more light sources 506 and a controlling processor 516. The arrangement of the scanner 300 is introduced such that the CIS 508 captures enough light near or along the curved region "C" in order to capture an image of the bound document 412 without any dark image reproduction in the curved region "C." The scanner 300 additional includes a user interface 301 as depicted in FIG. 3. Through the user interface 301, a user can provide various inputs related to scanning/copying such as number of copies, brightness, etc. Through the user interface 301, several notification messages can be displayed such as "scanning completed successfully" and so on.

A user submits a bound document 412 (512 of FIG. 5) for scanning. The user places the bound document 412 on the upper surface of the platen 502-U. In operation, the scanner 300 receives the bound document 412 for scanning and initiates scanning of the bound document 412. While scanning, the distance sensor 514 continuously measures the distance between the bound document 412 and the CIS 508 to detect a curved region "C" of the bound document 412. The distance measurement is used to adjust or control the light intensity so that when the bound document 412 is further from the CIS 508 (such as near the curved region of the bound document 412) the increase in light intensity prevents the creation of a dark band/strip in the scanned image of the bound document 412.

Upon detection, the controlling processor 516 varies the intensity of light at/along/near the curved region "C" of the bound document 412. For instance, if the distance between the bound document 412 and the CIS 508 is constant from the beginning, the light intensity remains the same. If the distance between the bound document 412 and the CIS 508 starts varying, the controlling processor 516 sends command signals to the light sources 506 for varying their illumination intensity. In an implementation, the controlling processor 516 is programmed to increase the illumination intensity when the distance between the bound document 412 and the CIS 508 starts increasing in the curved region "C" of the bound document 412, and then gradually decrease the illumination intensity at the end of curved region "C." As an example, the increase in intensity of light at or along the curved region of the bound document 412, can be shown through thick lines 517 of FIG. 5.

The controlling processor 516 increases the intensity of light such that enough light reaches the curved region "C" of the bound document 412 that is the reflected by the bound document 412. The light reflected by the bound document 412 is captured by the CIS 508. Based on the captured light, the CIS 508 gathers an input image of the bound document 412 and sends to the image processor 510 for further processing.

The image processor 510 finally generates a digital bound document without any dark strip at the curved region "C" and/or without any distortion. While generating the digital version, the image processor 510 may increase the brightness and contrast of the captured image at the location of the curved region "C" digitally. So ultimately a clearer bright image is produced. Thus, by having such arrangement of the scanner 300, the digital version of the bound document 412 is produced without having any dark image reproduction in the curved region "C" of the bound document 412.

Figure 6:
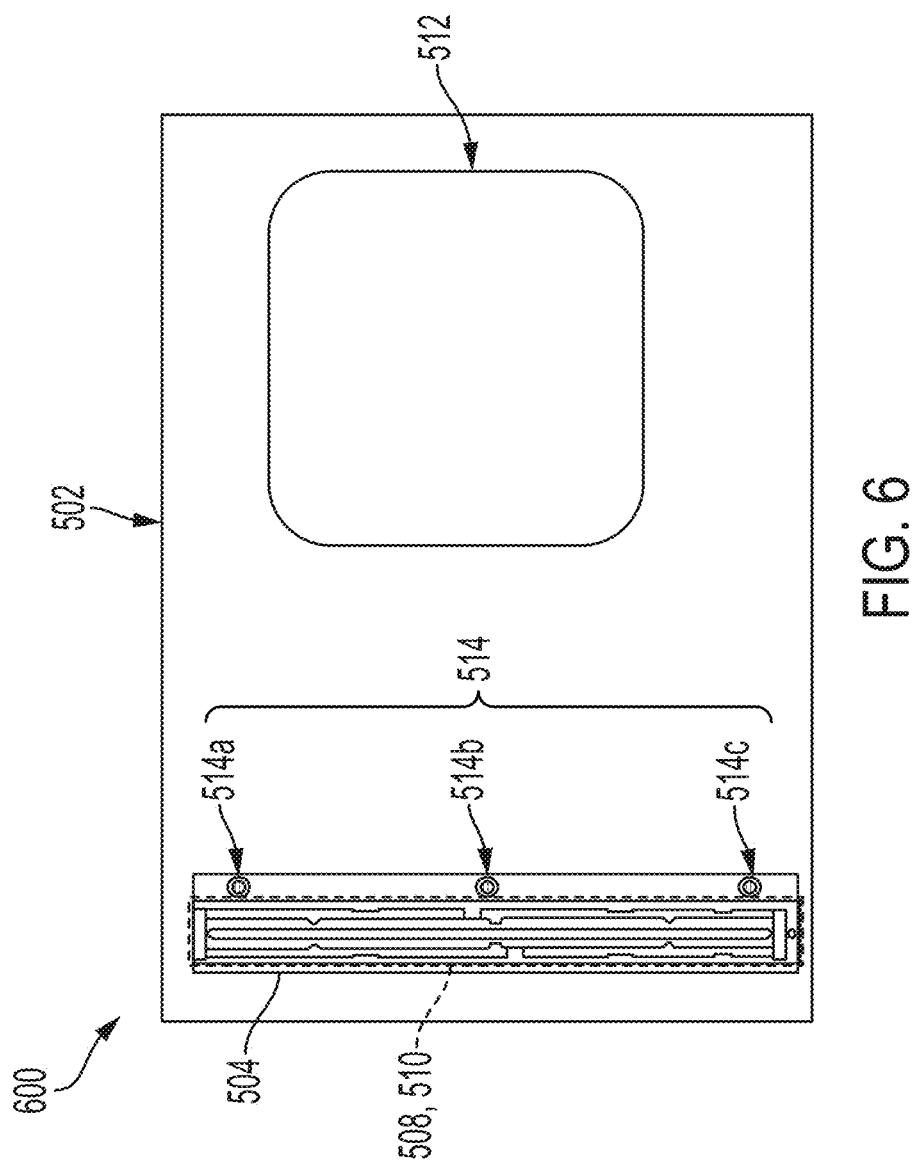
FIG. 6 illustrates a top view of the scanner in operation, in accordance with an embodiment of the present disclosure.
Figure 7:
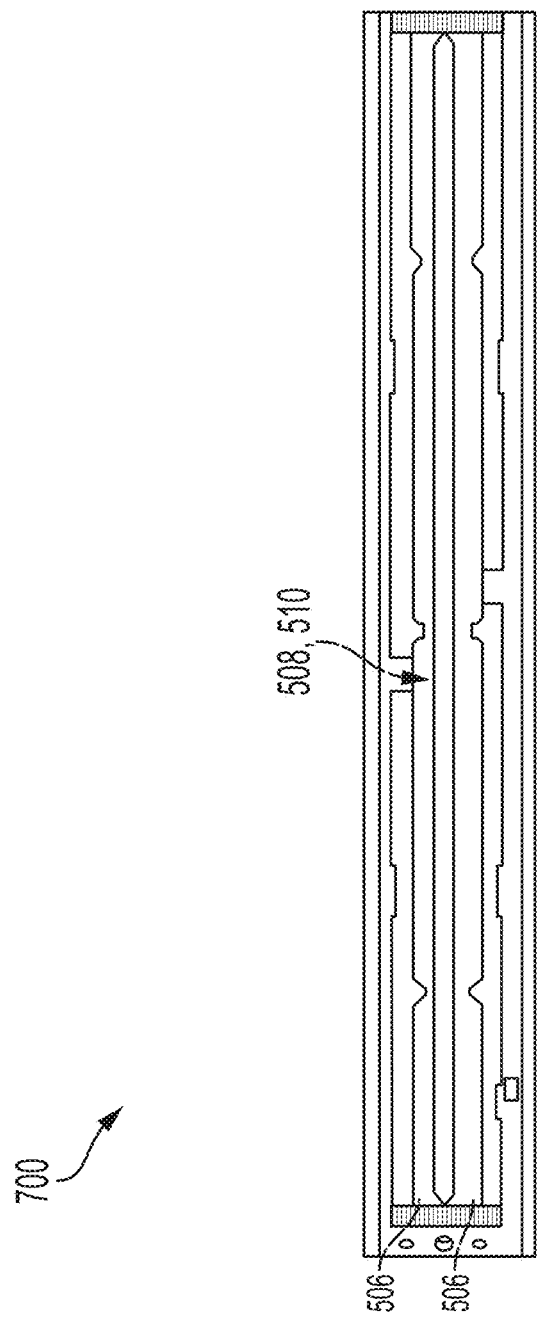
FIG. 7 illustrates a top view of a scan head of the scanner, in accordance with an embodiment of the present disclosure.

FIG. 6 illustrates a top view 600 of the scanner 300 scanning an open bound document 412, in accordance with an embodiment of the present disclosure. The top view 600 shows the platen 502, the scan head 504, the CIS 508 and the image processor 510. The view 600 further shows one or more distance sensors as 514a, 514b, 514c (collectively 514) and so on. The arrangement of the scanner 300 is introduced such that the CIS 508 captures enough light near or at the curved region in order to capture an image of the bound document without any dark image reproduction in the curved region "C." The CIS 508 along with other components is shown in subsequent FIG. 7. FIG. 7 illustrates a top view 700 of the scan head 504 of the scanner 300, in accordance with an embodiment of the present disclosure. In FIG. 7, light sources 506 is shown. The light sources 506 include arrays of light emitting diodes such as 506-1 and 506-2, arranged on both sides of the CIS 508. More details on the light source 506 will be discussed below.

Figure 8:
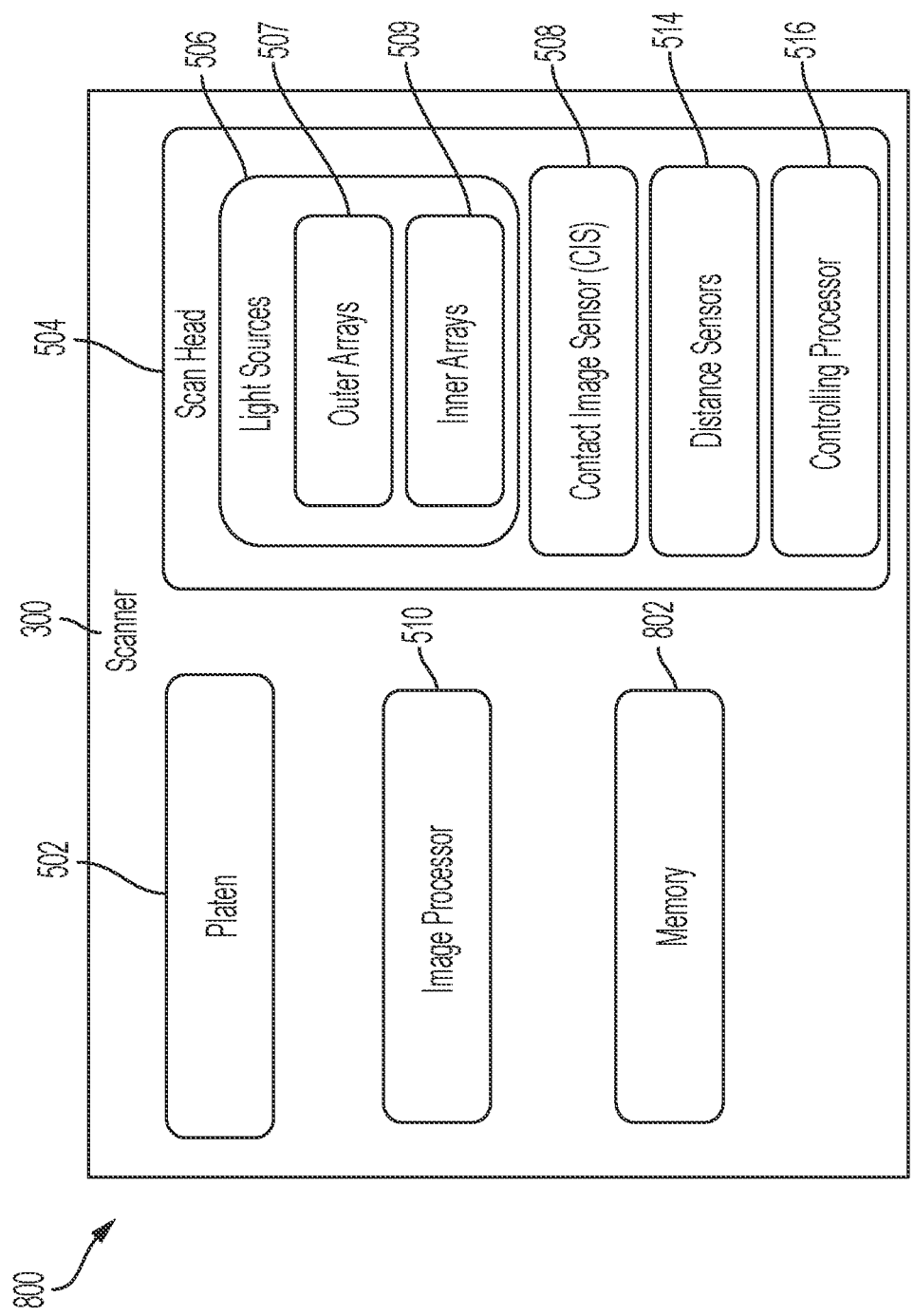
FIG. 8 illustrates a block diagram of the scanner, in accordance with an embodiment of the present disclosure.

FIG. 8 shows a block diagram 800 of the scanner 300 for implementing the present disclosure. The scanner 300 for example, is a flatbed scanner without limiting the scope of disclosure. Reference to other figures may be made while discussing FIG. 8.

The scanner 300 includes a platen 502, a scan head 504, a contact image sensor (CIS) 508, an image processor 510 and a memory 802. The scanner 300 additionally may include a user interface. In context of the current disclosure, the scanner 300 further includes one or more distance sensors 514, a light source 506, and a controlling processor 516. Each of the components coordinate and communicate with each other for scanning a bound document such as 412. The scanner 300 scans a bound document and generates a digital form of the bound document without any dark strip or without distortion. The bound document 412 has a flat region along its edge area and a curved region along its binging area. The bound book 412 can be any bound document having a curved region, without limiting the scope of the disclosure.

The platen 502 has an upper surface and a lower surface. The scan head 504 includes the light source 506, the CIS 508, the distance sensor 514 and the controlling processor 516. The scan head 504 is disposed beneath and in proximity of the lower surface of the platen 502, the scan head 504 moves across, and in proximity to, to the lower surface of the platen 502 so as to scan the bound document 412 placed on the upper surface of the platen 502. The CIS 508 is placed close to the light source 506 and the distance sensor 514 is placed before the CIS 508 in a direction of forwarding movement of the scan head 504. In one example, the length of the scan head 504 is equal to the width of the platen 502. The light source 506 is arranged on both sides of the CIS 508. The entire setup is placed on a supporting platform below the platen 502 and can be moved along the entire length of the bound document 412. All components 504, 506, 508, 510, 514 and 516 are disposed below the platen 502 in a movable configuration so as to allow the CIS 508 to capture entire lower surface of the bound document 412. Although FIG. 8 discusses a single distance sensor 514, but it is understood that the present disclosure can include multiple distance sensors (refer to FIG. 6) positioned at some distance from each other, without limiting the scope of the disclosure.

In context of the present disclosure, the light source 506 includes light emitting devices such as light emitting diodes whose intensity can be adjusted or varied by a command from the controlling processor 516. Light emitting diodes is one example, but other examples of the light emitting devices can be considered. For example, the intensity of the light source 506 can be varied with the use of additional light emitting diodes. The light source 506 emits light with a predefined intensity when the measured distance is within a specified range and emit lights with an increased intensity in the bound document's curved region where the measured distance is above the specified range. The range can be pre-defined with the scanner 300 or can vary based on the type of bound document. The light emitting diodes are arranged in the form of arrays on both sides of the CIS 508. Some of the light emitting diodes of the light source 506 are constantly activated to emit light during the entire scanning operation. But to increase the intensity of the light source 506, the controlling processor 516 activates (switched on) additional light emitting diodes of the light source 506 to emit light to illuminate the curved region "C" of the bound document 412. With the help of additional activated light emitting diodes along with the already activated light emitting diodes, the intensity of the light source 506 is increased. At the end of the curved region "C," the activated light emitting diodes are deactivated (switched off).

Figure 9:
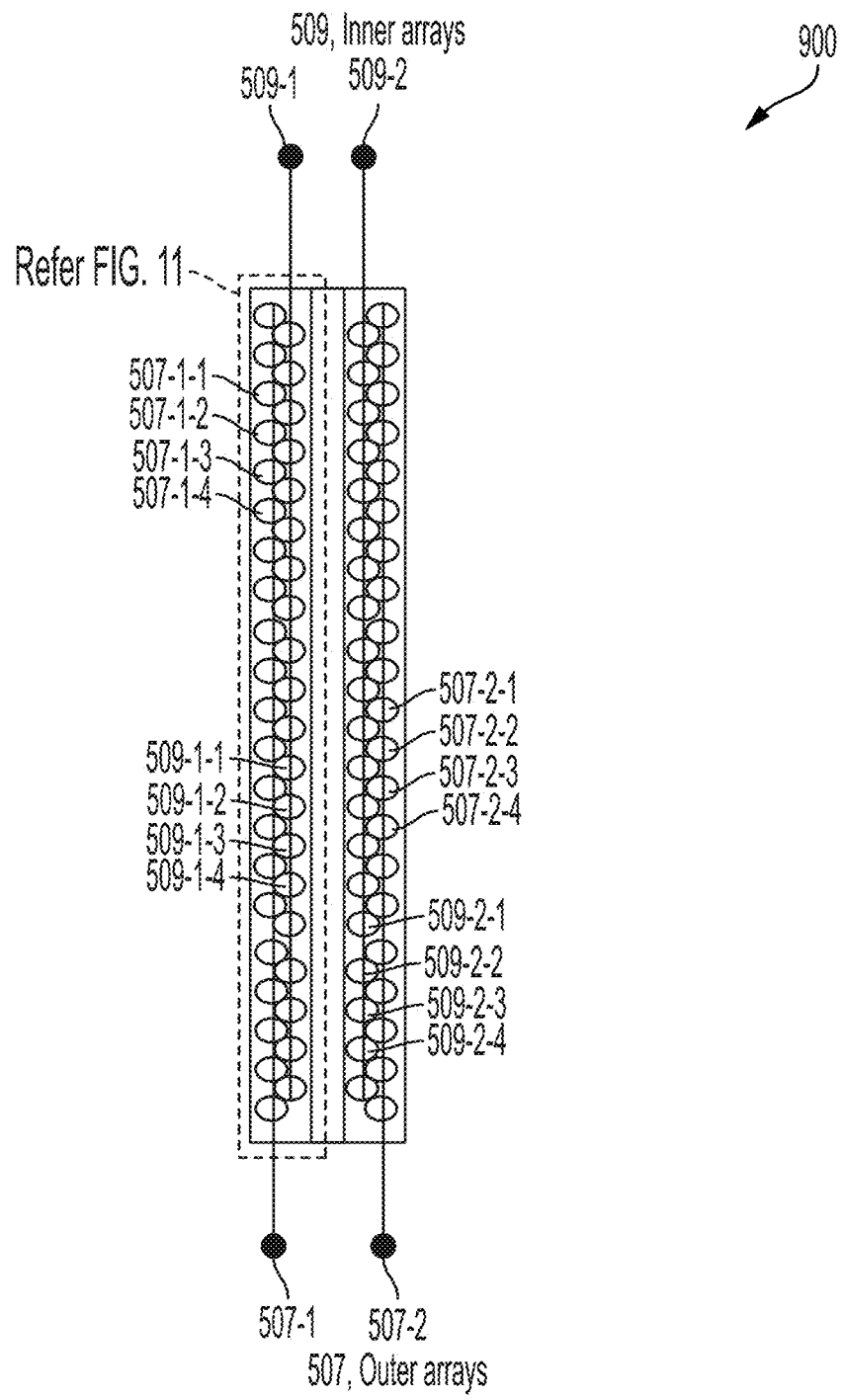
FIG. 9 shows a light source having a plurality of light emitting devices in form of outer arrays and inner arrays.

In an implementation, the light source 506 includes outer arrays of light emitting diodes 507 and inner arrays of light emitting diodes 509. The outer and inner arrays should not be confused with their positioning of the arrays and can be considered as primary and secondary (auxiliary) arrays of light emitting diodes, respectively. The light emitting diodes of the outer arrays 507 can be called as outer light emitting diodes and the light emitting diodes of the inner arrays 509 can be called as inner light emitting diodes. The outer arrays 507 include multiple light emitting diodes arranged on both sides of the CIS 508. The inner arrays 509 include multiple light emitting diodes arranged on both sides of the CIS 508. The outer arrays 507 are activated during the entire scanning operation, i.e., entire scanning of the book. While the inner arrays 509 are activated only near or along the curved region of the bound book. The inner arrays 509 are activated in addition to the activated outer arrays 507. Specifically, the inner arrays 509 are activated during scanning of the curved region of the bound book, i.e., upon detection of the curved region of the bound book. One such arrangement of the light source 506 having the outer arrays 507 and the inner arrays is shown in FIG. 9. According to FIG. 9, two rows (507-1 and 507-2) of the outer arrays 507 are shown. Similarly, two rows (509-1 and 509-2) of the inner arrays 509 are shown, where one array (509-1) is arranged on side of the CIS 508, while the second array (509-2) is arranged on other side of the CIS 508. The same arrangement is for the outer arrays 507. As shown, the outer arrays 507 include multiple light emitting diodes. For example, the outer array 507-1 includes light emitting diodes as 507-1-1, 507-1-2, 507-1-3, 507-1-4 and so on. The outer array 507-2 includes multiple light emitting diodes as 507-2-1, 507-2-2, 507-2-3, 507-2-4, and so on. Similarly, the inner arrays 509 include multiple light emitting devices. For example, the inner array 509-1 includes light emitting diodes as 509-1-1, 509-1-2, 509-1-3, 509-1-4, and so on. The inner array 509-2 includes multiple light emitting diodes as 509-2-1, 509-2-2, 509-2-3, 509-2-4, and so on. The light emitting diodes in the outer arrays 507 may be arranged individually or may be arranged in the form of one or more groups. Similarly, the light emitting diodes in the inner arrays 509 may be arranged individually or may be arranged in the form of one or more groups. In the latter case, four light emitting diodes may be clubbed together to form a group and many such groups can be formed based on the number of light emitting diodes in each inner array 509. There can be any number of light emitting diodes in the outer arrays 507. The number of light emitting diodes may vary in each array 507-1 and 507-2. On the similar lines, there can be any number of light emitting diodes in the inner arrays 509 and the number may vary in each array 509-1 and 509-2. The outer arrays 507 and inner arrays 509 may not represent continuous arrays. The light emitting diodes in the outer arrays 507 and/or the inner arrays 509 are capable of being activated or deactivated individually or as one or more groups. With the outer and inner arrays 507 and 509, the light emitting can be changed in x direction and y direction.

The controlling processor 516 varies the intensity of light, if the distance varies. As an example, the intensity is increased by a quantum with which distance between the bound document 412 and the CIS 508 increases. Similarly, the intensity may be decreased by a quantum with which distance between the bound document 412 and the CIS 508 decreases. The controlling processor 516 controls the outer arrays 507 and the inner arrays 509. In one example, the controlling processor 516 controls the inner arrays 509 to vary the intensity of light at or along the curved region such that content present in the curved region of the bound document 412 is captured, upon detection of the curved region. Increasing the intensity of light increases the reach of light in the curved region of the bound document 412. The controlling processor 516 increases the intensity of light by activating light emitting diodes in the inner arrays 509. In an example, the controlling processor 516 may activate individual inner light emitting diodes or one or more groups of the inner light emitting diodes. The controlling processor 516 deactivates the one activated inner light emitting diodes when an end of the curved region is detected. In this manner, the controlling processor 516 controls the intensity (increase or decrease) of light based on the distance by activating or deactivating the inner light emitting diodes at or along the curved region "C."

The distance sensor 514 may be one of an inductive a proximity sensor, a capacitive proximity sensor, and a photoelectric sensor. The distance sensor 514 includes a sender 514-S to emit signals and a receiver 514-R to receive reflected signals from the bound document 412. Based on the time gap of receipt of the reflected signals, the distance sensor 514 detects the distance from the bound document 412. The scanner 300 can have multiple distance sensors for different areas along the curved region "C" and adjust the lighting in different portions of the curved region separately.

In operation, a user places the bound document 412 on the platen 502 for copying or scanning. The user places the bound document 412 on the upper surface of the platen 502 for scanning. The user can place the bound document 412 in any direction or position. For example, the user can place the bound document 412 in landscape orientation. In another example, the user can place the bound document 412 in a portrait orientation, i.e., 90 degree to the platen 502.

Upon receiving the bound document 412, the controlling processor 516 triggers the scan head 504 and the distance sensor 514. The scan head 504 moves across in proximity to the lower surface of the platen 502 to scan the bound document 412 placed on the upper surface of the platen 502. While initiating scanning, the outer arrays 507-1 and 507-2 are activated. Here, each light emitting diode of the arrays 507-1 and 507-2 is activated and remain active till the entire scanning operation. Upon activation, the arrays 507 emit light to illuminate the bound document 412 with an intensity, say A. As the scan head 504 travels in the forward direction, the distance sensor 514 continuously monitors and measures the distance between bound document 412 and the CIS 508. The distance is measured to detect the curved region of the bound document 412. Initially, the distance between the bound document 412 and the CIS 508 remains constant due to the flat region and after the flat region ends, the distance between the bound document 412 and the CIS 508 starts increasing. The increase in the distance indicates the curved region of the bound document 412. When the scan head 504 further travels, the distance between the bound document 412 and the CIS 508 starts decreasing and this indicates the end of the curved region of the bound document 412. After this, the distance between the bound document 412 and the CIS 508 remains constant; this indicates the flat region of the bound document 412. In this way, the distance sensor 514 detects the curved region of the bound document 412 and an end to the curved region "C."

Based on the distance measured, the curved region is detected. Upon detection of the curved region, the distance sensor 514 sends a signal to the controlling processor 516 indicating the curved region. The controlling processors 516 generates a control command to vary the intensity of the light to be emitted from the light source 506 upon detection of the curved region of the bound document 412 in order to capture a complete image of the bound document 412 at the curved region. Based on increase in the distance, the intensity of the light from the light source 506 is increased by the controlling processor 304. To increase the intensity of light, the controlling processor 516 activates the inner arrays 509 in addition to the already activated outer arrays 507. The controlling processor 516 may activate individual multiple light emitting diodes of the inner arrays 509. The controlling processor 516 may activate one or more groups of the inner arrays 509 such as group 1, group 2 and so on. Each group may include four LEDs or more. In further example, the controlling processor 516 may activate the entire inner arrays 509. This increase in light intensity precisely offsets the loss of reflected light by the curved region "C" (or by the curvature of the spine region "S"). The increase in intensity of light helps enough light to reach the curved region of the bound document 412 in order to capture the complete image of the bound document 412. In this way, enough light reaches the curved region of the bound document 412 that is then captured by the CIS 508. As the curved region starts to end, the controlling processor 516 further controls the intensity by decreasing the intensity of light. To this end, the controlling processor 516, deactivates the activated light emitting diodes of the inner arrays 509. For example, the controlling processor 516 may deactivate the entire inner arrays 509, if activated. In another example, the controlling processor 516 may deactivate the individually activated light emitting diodes. In further example, the controlling processor 516 may deactivate the one or more groups, if activated. In all, the controlling processor 516 increases the illumination intensity when the distance between the bound document 412 and the CIS 508 starts increasing in the curved region, and then gradually decrease the illumination intensity at the end of the curved region. It can be considered that the inner light emitting diodes emit light of intensity B at the curved region. At the curved region, the total intensity is A (of outer arrays)+B (of inner arrays) and this refers to the increase in intensity, while non-curved region is illuminated with intensity A.

If the curved region of the bound document 412 is not parallel to the platen 502, i.e. if one end of bound document 412 is closer to the platen 502 than the other end, then the inner light emitting diodes are activated based on which end of the bound document 412 is closer to the platen 502 surface. This helps in achieving even brightness along the curved region "C."

If the curved region of the bound document 412 is uneven or if the bound document 412 is closer to the scanner 300 at one end of the curved region than the other end, then more number of inner light emitting diodes at that end, where the book curved region is closer to the scanner 300, are activated. If the curved region is closer to the platen 502 at one end than the other end, then the inner light emitting diodes may be clubbed into small groups.

Then, the CIS 508 starts gathering an input image from the reflected light by the bound document 412 and sends it to the image processor 510 for conversion to the digital form. The image processor 510 receives the captured input image of the bound document 412 from the CIS 508 and creates a digital version of the bound document 412, i.e., a digital copy of the bound document 412. While creating the digital version, the image processor 510 increases the brightness and contrast of the captured image at the location of the curved region digitally. Finally, a digital bound book (i.e., scanned bound book) is generated from the bound document 412.

Thus, with the implementation of the inner arrays 509, in addition to the outer arrays 507, the distance sensor 514 and the controlling processor 516, the scanner 300 is able to facilitate the CIS 508 with enough light reflected from the surface of the bound document 412, specifically near or at the curved region of the bound document 412. As a result, a copy of the bound document 412 is created without a dark black strip at the curved region or without any distortion.

The memory 802 stores scanned output, stores scanning properties or any details relevant for implementing the present disclosure.

In addition, the scanner 300 may include one or more processor(s) (although not shown in FIG. 8). The one or more processor(s) may be implemented as one or more microprocessors, microcomputers, microcontrollers, digital signal processors, central processing units, logic circuitries, and/or any devices that manipulate data based on operational instructions. Among other capabilities, the one or more processor(s) is configured to fetch and execute computer-readable instructions stored in a memory 802 of the scanner 300. The memory 802 may store one or more computer-readable instructions or routines, which may be fetched and executed to generate a digital document. The memory 802 may include any non-transitory storage device including, for example, volatile memory such as RAM, or non-volatile memory such as EPROM, flash memory, and the like.

The scanner 300 may also include an interface(s). The interface(s) may include a variety of interfaces, for example, interfaces for data input and output devices referred to as I/O devices, storage devices, and the like. The interface(s) may facilitate communication of the scanner 300 with various devices coupled to the scanner 300. The interface(s) may also provide a communication pathway for one or more components of the scanner 300. Examples of such components include, but are not limited to, the distance sensor 514, the light source 506, the controlling processor 516, and processing engine(s).

The processing engine(s) may be implemented as a combination of hardware and programming (e.g., programmable instructions) to implement one or more functionalities of the processing engine(s). In examples described herein, such combinations of hardware and programming may be implemented in several different ways. For example, the programming for the processing engine(s) may be processor executable instructions stored on a non-transitory machine-readable storage medium and the hardware for the processing engine(s) may include a processing resource (e.g., one or more processors), to execute such instructions. In the present examples, the machine-readable storage medium may store instructions that, when executed by the processing resource, implement the processing engine(s). In such examples, the scanner 300 may include the machine-readable storage medium storing the instructions and the processing resource to execute the instructions, or the machine-readable storage medium may be separate but accessible to scanner 300 and the processing resource. In other examples, the processing engine(s) may be implemented by electronic circuitry.

In one example, the processing engine(s) may include the controlling processor 516 and the image processor 510. In an example, the controlling processor 516 and the image processor 510 may be implemented as one or more microprocessors, microcomputers, microcontrollers, digital signal processors, central processing units, state machines, logic circuitries, configurable hardware units, and/or any devices that manipulate signals based on operational instructions.

FIG. 9 is a top view 900 of the platen 502 including CIS 508 and the light source 506 having outer arrays 507 and inner arrays 509 arranged on both sides of the CIS 508. 507-1 and 507-2 represent the outer arrays that remain active throughout the scanning operation. The outer arrays 507 further include a plurality of light emitting diodes 507-1-1, 507-1-2, 507-1-3, 507-1-4, 507-2-1, 507-2-2, 507-2-3, 507-2-4 and so on. 509-1 and 509-2 represent the inner arrays that are activated when the curved region is detected. The inners arrays 509 further include a plurality of light emitting diodes 509-1-1, 509-1-2, 509-1-3, 509-1-4, 509-2-1, 509-2-2, 509-2-3, 509-2-4 and so on. The light emitting diodes in the inner arrays 509 are selectively activated by the controlling processor 516 based on the curved region. In some examples, multiple groups are activated, while in other examples, individuals light emitting diodes are activated. If the curvature of the book is uneven or if the book is closer to the scanner at one end of the curved region than the other end, then more numbers of light emitting diodes at that end where the book curved region is closer to the scanner 300, are activated.

Figure 10:
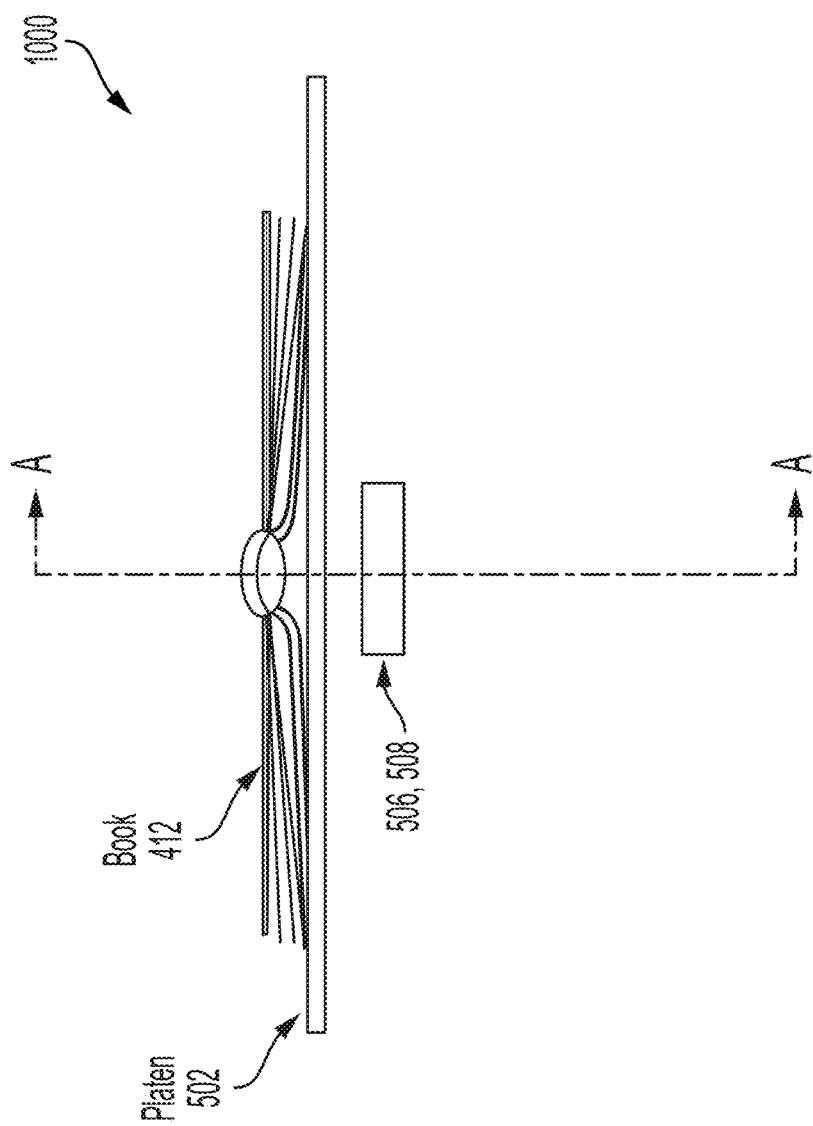
Figure 11:
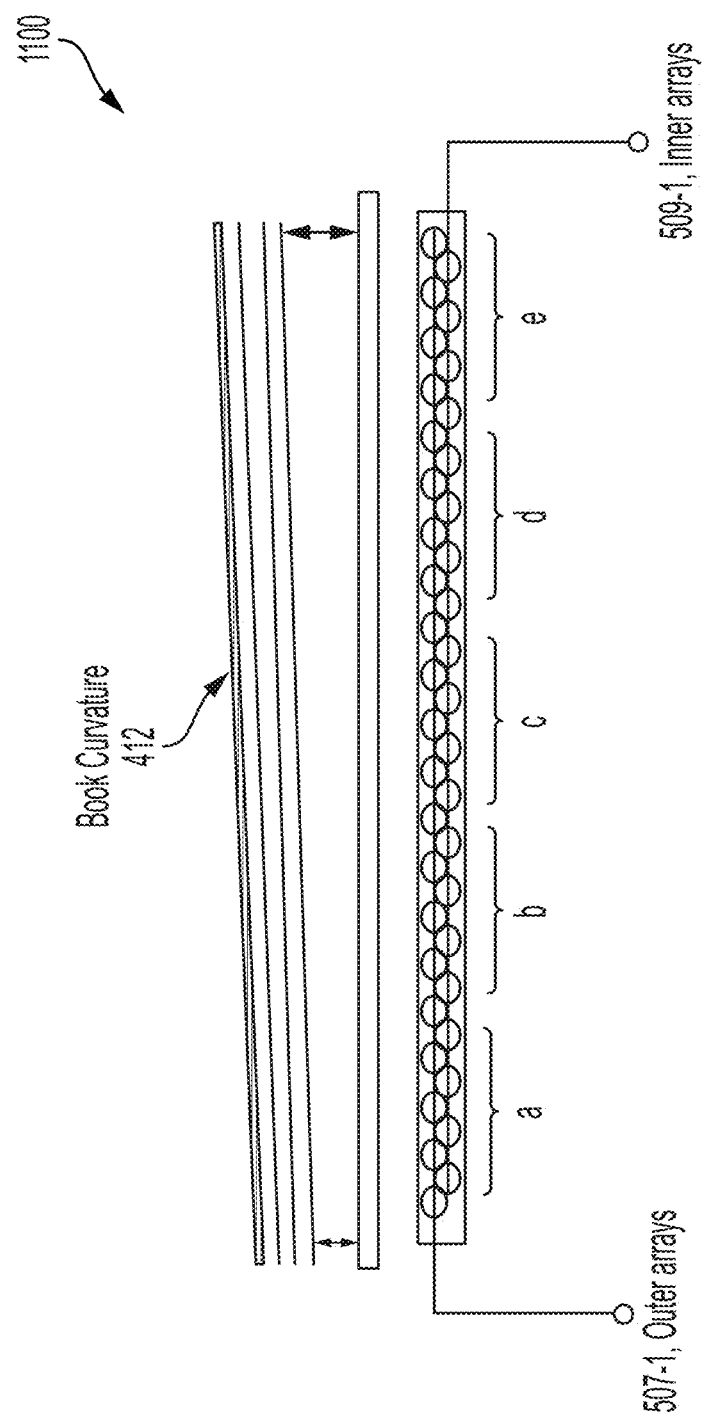
FIG. 11 represents a view of the scanner along A-A axis.

FIG. 10 shows a front view 1000 of the scanner 300. The front view shows the platen 502, the bound book 512, and CIS 508 and the image processor 510. When seen along the axis A-A, view (marked as 1100) as shown in FIG. 11 is obtained. The arrow shows the curved region of the bound book. The section A-A view further shows the outer arrays 507 and the inner arrays 509, the inner arrays 509 are active only during scanning of the curved region. Various groups such as a, b, c, d, e are shown. Each group include a pre-defined number of light emitting diodes, such as four. For example, all groups a, b, c, d, e includes four light emitting diodes. But each group may include any number of light emitting diodes. For example, one group may include four light emitting diodes, another group may include three light emitting diodes, or five light emitting diodes, and so on. If the curved region is closer to the platen 502 at one end than the other as shown, then the light emitting diodes are clubbed into small groups and activated.

Method Flowcharts

Figure 12:
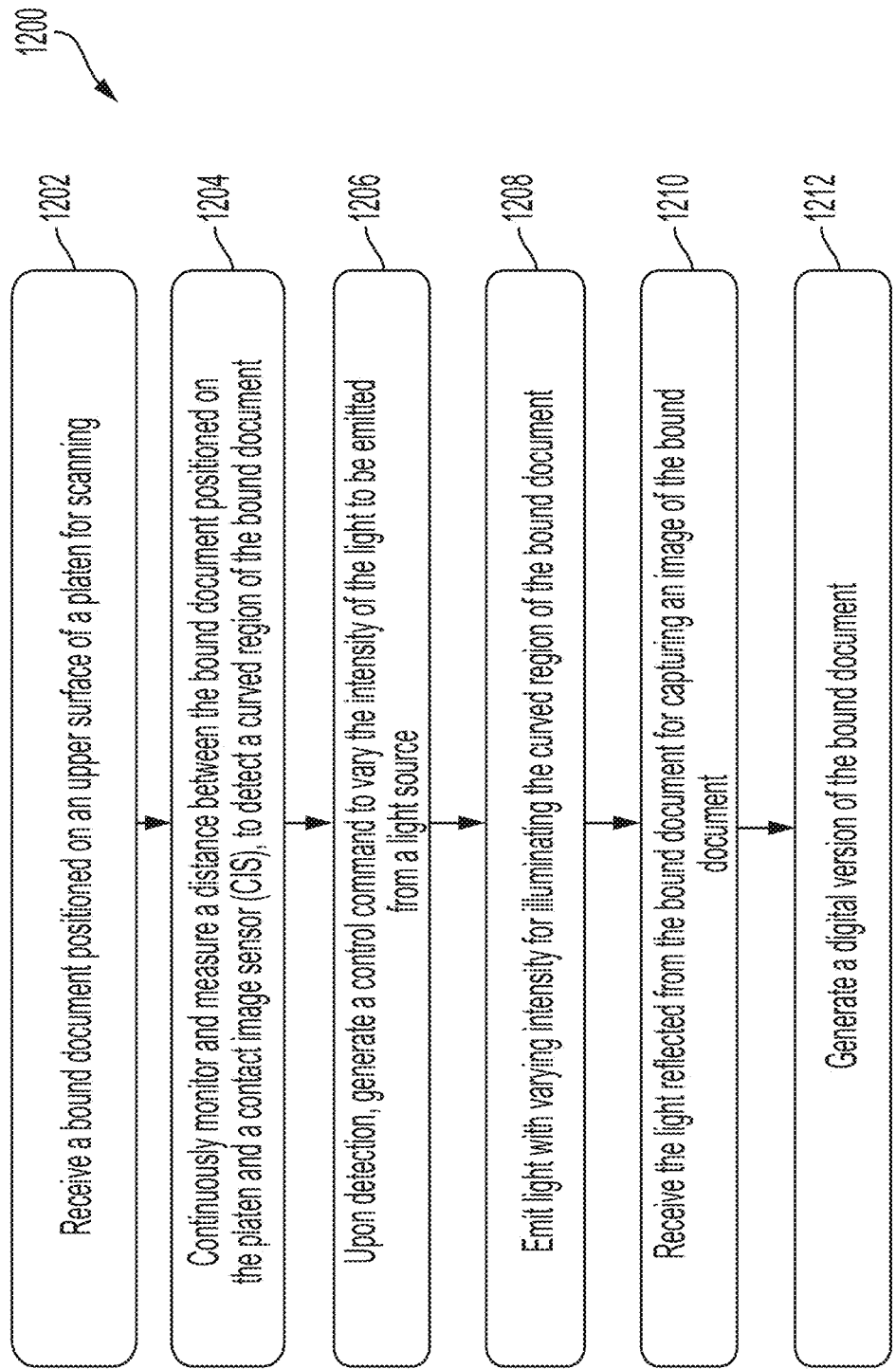
FIG. 12 is a method flowchart for scanning a bound document.

FIG. 12 is a method flowchart 1200 for scanning a bound document such as a bound book. Reference to other figures may be made while discussing FIG. 12. Specifically, the method flowchart 1200 relates to scanning a bound document with varying light intensity. The method is implemented by a scanner 300, which uses light sources whose output intensity can be varied with the help of additional light sources such as light emitting diodes. The order in which the method 1200 is described is not intended to be construed as a limitation, and any number of the described method blocks can be combined in any appropriate order to carry out the method or an alternative method.

The method 1200 can be performed by programmed computing devices, for example, based on instructions retrieved from the non-transitory computer-readable medium or non-transitory computer-readable media. The computer-readable media can include machine-executable or computer-executable instructions to perform all or portions of the described method. The computer-readable media may be, for example, digital memories, magnetic storage media, such as magnetic disks and magnetic tapes, hard drives, or optically readable data storage media.

During scanning of a bound book, issues such as dark images/strips in a curved region or content missing are faced due to lack of reachability of light in the curved region. To overcome such issue, the method 1200 introduces a feature of increasing intensity of light to increase the reachability of light to the curved region in order to capture the complete content present therein. To this end, the method 1200 first identifies the curved region based on the distance between the bound document and a contact image sensor (CIS). The bound document is flat but is curved in the center region. Accordingly, those skilled in the art can appreciate that the constant distance between the bound document and the CIS defines the flat region, while the varying distance between the bound document and the CIS unit defines the curved/spine/binding region.

The method 1200 begins when a user wishes to create a digital version of the bound book. The digital version is created by scanning or copying the bound document. The user submits the bound book for scanning. At block 1202, the bound document 412 is received that is positioned on an upper surface of a platen 502 of the scanner 300. The bound book, when opened for scanning, includes a flat region and a curved region. The scanning is performed by a movable scan head 504 of the scanner 300. The light sources include a plurality of light emitting diodes whose output intensity is adapted to be varied with the use of additional light emitting diodes.

At block 1204, the distance between the bound book positioned on the platen and a contact image sensor (CIS) unit 508 is continuously monitored and measured. The distance between a lower face of the bound book positioned on the platen 502 of the scanner 300 and the contact image sensor (CIS) is continuously monitored and measured. The distance measurement starts when the scan head 504 starts moving from left to right in the x-axis direction. The distance is measured to detect the curved region of the bound book. When the distance between the bound book and the CIS remains constant, the region is defined as the flat region of the bound book. When the distance between the bound book and the CIS is varied, the region is defined as the curved region of the bound book 512. In this way, the curved region of the bound book is detected. In an example, when the measured distance is within a specified range then, the light is emitted with a pre-defined intensity. When the measured distance is above the specified range, the light is emitted with an increased intensity in the bound document's curved region. The value of the increased intensity is directly proportional to the quantum of increase in the measured distance above the specified range.

At 1206, a control command is generated to vary the intensity of light to be emitted from the light source, upon detection of the curved region. The intensity of light is varied such that content present in the curved region of the bound document is captured. At 1208, based on the control command, the light with varying intensity is emitted for illuminating the curved region of the bound book. Emitting the light with varying intensity includes emitting the light with increased illumination intensity when the distance between the bound document and the CIS starts increasing in the curved region. Emitting the light with varying intensity further includes gradually decreasing the illumination intensity of the emitted light at the end of the curved region. As a result, the light source emits light on the platen with increased intensity in order to increase the reach through the curved region of the bound book or to reach the depth of the curved region of the bound book. Emitting light with increased intensity, by the light source, on the platen in the detected curved region of the bound document increases the reach through the curved region of the bound document.

The light emitted on the bound book is reflected from the bound book. The light with increased intensity gets reflected by the bound book, which is then captured by the CIS to capture images.

At 1210, the light reflected from the bound book is received for capturing an image of the bound book. Using the reflected light, the CIS captures images of the curved region accurately and completely. In this manner, images of the curved region are captured. Finally, at 1212, a digital version of the bound book is generated.

Figure 13:
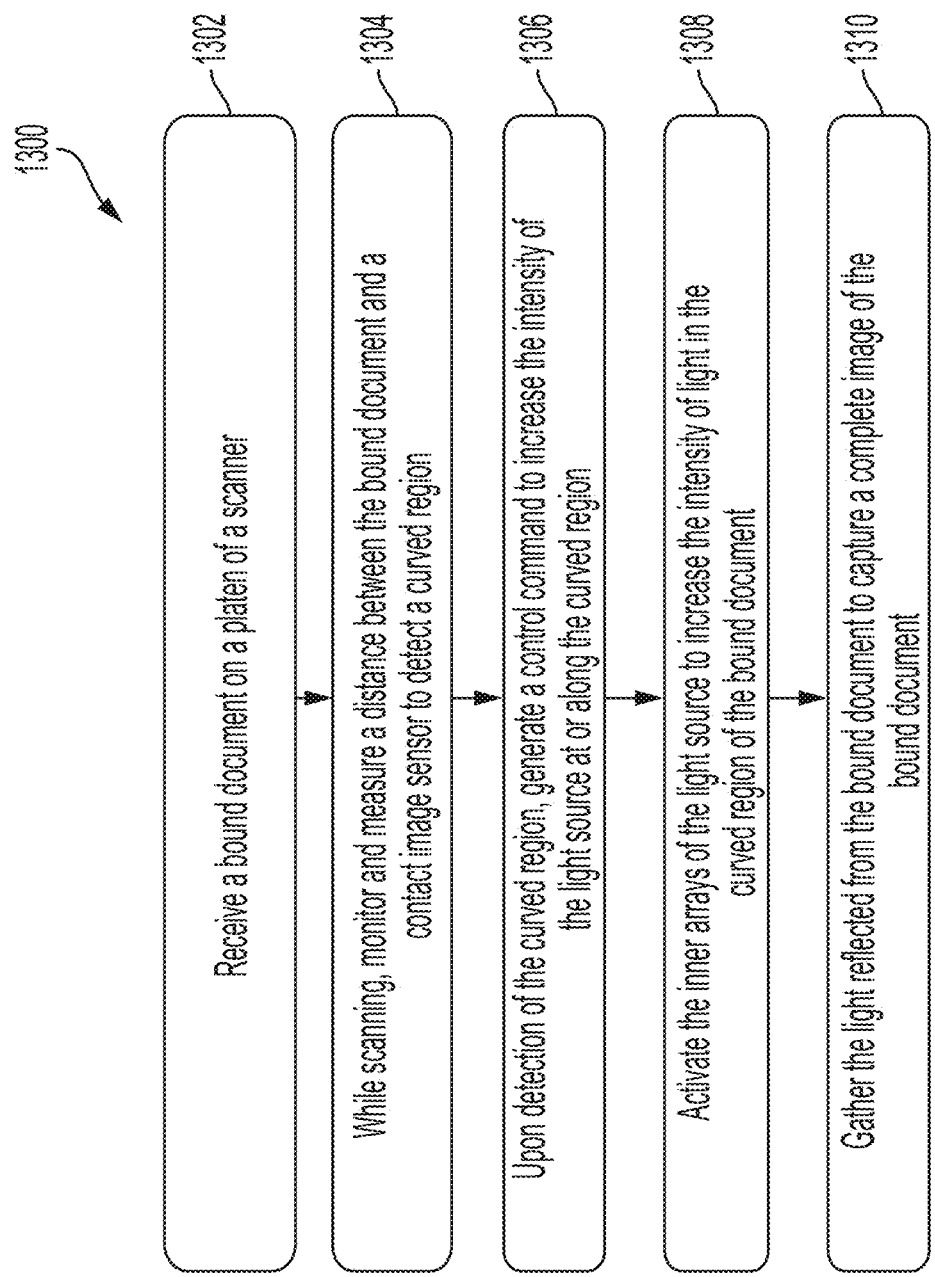
FIG. 13 is a method flowchart for scanning or copying a bound document.

FIG. 13 is a method flowchart 1300 for scanning a bound document. Reference to other figures may be made while discussing FIG. 13. The method 1300 is implemented at a scanner such as 300 or a photocopier device. The scanner 300 includes a light source such as light emitting devices. One such example of light emitting devices is light emitting diodes without limiting the scope of disclosure. The light source includes outer arrays of light emitting diodes and inner arrays of light emitting diodes, arranged on both sides of a contact image sensors such as 508.

The method 1300 begins when a user wishes to scan a bound document. The user submits the bound document to the scanner 300. In particular, the user positions the bound document on a platen such as 502 of the scanner 300. At 1302, the bound document is received on the platen of the scanner 300. The bound document has a flat region and a curved region. Upon receiving the bound document, scanning of the bound document is initiated. While initiating scanning, the outer arrays of light emitting diodes are activated and remain activated during the entire scanning operation. Here, each outer light emitting device is activated to illuminate the bound document. The outer arrays of light emitting diodes emit light of given intensity.

At 1304, while scanning, a distance between the bound document and the contact image sensor is continuously monitored and measured in order to detect the curved region. For example, if the distance remains constant, the region defines the flat region of the bound document. If the distance starts varying between the bound document and the contact image sensor because of the curved region (i.e., curvature of the paper), then the curved region is defined. At 1306, upon detection of the curved region, a control command is generated to increase the intensity of the light source at or along the curved region.

The distance measurement is used to adjust the light intensity so that when the bound document 412 is further from the contact image sensor 508 (such as near the curved region of the book), the light is increased to prevent the creation of a dark band in the scanned image.

In an implementation, the brightness output may be controlled by activating and deactivating a desired number of the inner light emitting diodes, while all outer light emitting diodes remain active throughout the scanning operation.

At 1308, the inner arrays of the light emitting diodes are activated to increase the intensity of light in the curved region of the bound document, in addition to the already activated outer arrays. The inner arrays are activated only when the curved region is detected. The inner arrays include a plurality of light emitting diodes. In an example, each light emitting diode of the inner arrays are activated. In another example, some individual light emitting diodes are activated. In further example, one or more groups of light emitting diodes are activated. The inner arrays of the light emitting diodes when activated increases the intensity of light. The inner arrays emit light to illuminate the curved region such that content present in the curved region is well captured.

Then, the distance is continuously monitored and measured to detect the end of the curved region. When the distance between the bound document the contact image sensor decreases, the end of the curved region is detected. Upon detection of the end of the curved region, the inner arrays of the light emitting diodes are deactivated. For example, if each light emitting diodes of the inner arrays is activated then, each activated light emitting diodes is deactivated. In another example, if one or more groups are activated, then the activated one or more groups are deactivated. In this way, scanning of the bound document is finished.

The outer arrays of light emitting diodes emit light of defined intensity and with the use of additional light source such as inner arrays of light emitting diodes, the intensity of the light source is varied (increase and decrease). The intensity of light is increased by activation of the inner arrays and the intensity of light is decreased by deactivation of the inner arrays.

In an example, the brightness output is controlled by activating and deactivating a desired number of the inner light emitting diodes.

If the curved region of the bound document is not parallel to the platen, i.e. if one end of bound document is closer to the platen than the other end, then a desired number of inner light emitting diodes are activated based on which end of the book is closer to the platen surface. This helps in achieving even brightness along the curved region.

The light emitted on the bound document is reflected by the bound document. At 1310, the light reflected from the bound document is gathered to capture a complete image of the bound document. Finally, a digital version of the bound document is generated based on the captured image.

Thus, with the implementation of the scanner of the present disclosure, the digital document as generated without having any dark image reproduction in the curved region or without any distortion.

The present disclosure discloses methods and systems for scanning bound document with varying light intensity. The bound documents are scanned such that there is no black strip at the center while scanning the bound documents because of the curvature of the paper in the center. Also, there is no distortion in the scanned bound documents. Varying the light intensity helps avoid the problem of reachability of light in the curved region, thereby no content is missed. Further, varying the intensity of light helps enough light to reach to the contact image sensors in order to capture the complete image of the bound document. In addition, the user does not require to push the bound documents hard on to a platen to decrease the gap between a sensor and the paper.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, monitoring, measuring, scanning, controlling, adjusting, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A scanner for scanning a bound document, the scanner comprising:
    a platen having an upper surface and a lower surface, wherein on the upper surface of the platen, a bound document is positioned for scanning, and wherein the bound document, when opened for scanning, comprises a flat region and a curved region;
    a scan head disposed beneath and in proximity of the lower surface of the platen, the scan head is to move across, and in proximity to, to the lower surface of the platen so as to scan the bound document placed on the upper surface of the platen, wherein the scan head comprises:
        a light source to emit light for illuminating the bound document, wherein the light source comprises outer arrays of light emitting devices and inner arrays of light emitting devices;
        a contact image sensor (CIS) to receive the light reflected from the bound document for capturing an image of the bound document;
        at least one distance sensor to continuously monitor and measure a distance between the bound document and the CIS to detect the curved region of the bound document; and
    a controlling processor, coupled to the at least one distance sensor, to generate a control command to vary the intensity of the light to be emitted from the light source, upon detection of the curved region of the bound document in order to capture a complete image of the bound document at the curved region, wherein the controlling processor activates the outer arrays of light emitting devices during the entire scanning operation, wherein the controlling processor activates the inner arrays of light emitting devices, upon detection of the curved region of the bound document, and wherein the controlling processor deactivates the inner arrays of light emitting devices when an end of the curved region is detected; and
    an image processor to generate a digital version of the bound document without any dark strip or without any distortion.

2. The scanner of claim 1, wherein the bound document is positioned on the platen in a particular direction.

3. The scanner of claim 1, wherein the controlling processor increases the illumination intensity when the distance between the bound document and the CIS starts increasing in the curved region, and then gradually decreases the illumination intensity at the end of the curved region.

4. The scanner of claim 1, wherein the image processor receives the captured image of the bound document from the CIS to create the digital version of the bound document.

5. The scanner of claim 1, wherein the light source emits light with a predefined intensity when the measured distance is within a specified range and emits light with an increased intensity in the bound document's curved region where the measured distance is above the specified range.

6. The scanner of claim 1, wherein the controlling processor varies the intensity of light such that content present in the curved region of the bound document is captured, upon detection of the curved region.

7. The scanner of claim 1, wherein the light source comprises light emitting devices whose output intensity is adapted to be varied with the use of additional light emitting devices.

8. The scanner of claim 1, wherein the outer arrays comprise a plurality of light emitting diodes and the inner arrays comprise a plurality of light emitting diodes.

9. The scanner of claim 1, wherein the controlling processor activates individual light emitting devices of the inner arrays.

10. The scanner of claim 1, wherein the outer arrays of light emitting devices and the inner arrays of light emitting devices are arranged on both sides of the CIS.

11. A method for scanning a bound document, the method comprising:
    receiving a bound document positioned on an upper surface of a platen for scanning, wherein the bound document, when opened for scanning, comprises a flat region and a curved region;
    continuously monitoring and measuring a distance between the bound document positioned on the platen and a contact image sensor (CIS), to detect the curved region of the bound document;
    upon detection, generating a control command to vary the intensity of the light to be emitted from a light source, wherein the light source comprises outer arrays of light emitting devices and inner arrays of light emitting devices;
    emitting light with varying intensity for illuminating the curved region of the bound document, wherein emitting light with varying intensity comprises:

activating the outer arrays of light emitting devices during the entire scanning operation;
activating the inner arrays of light emitting devices, upon detection of the curved region of the bound document; and
deactivating the inner arrays of light emitting devices when an end of the curved region is detected;
receiving the light reflected from the bound document for capturing an image of the bound document; and
generating a digital version of the bound document.

12. The method of claim 11, further comprising emitting light with a predefined intensity when the measured distance is within a specified range and emitting light with an increased intensity in the bound document's curved region where the measured distance is above the specified range.

13. The method of claim 11, further comprising generating the control command to vary the intensity of light such that content present in the curved region of the bound document is captured, upon detection of the curved region.

14. The method of claim 11, wherein the light source includes a plurality of light emitting devices whose output intensity is adapted to be varied with the use of additional light emitting devices.

15. The method of claim 11, wherein the outer arrays comprise a plurality of light emitting diodes and the inner arrays comprise a plurality of light emitting diodes.

16. The method of claim 11, further comprising activating one or more groups of light emitting devices of the inner arrays.

17. The method of claim 11, further comprising activating individual light emitting devices of the inner arrays.

18. The method of claim 11, wherein emitting light with varying intensity comprising:
emitting the light with increased illumination intensity when the distance between the bound document and the CIS unit starts increasing in the curved region; and
gradually decreasing the illumination intensity of the emitted light at the end of the curved region.

19. A method, comprising:
receiving a bound document on a platen of a scanner for scanning, the bound document comprising a flat region and a curved region, wherein the scanner comprises a light source having outer arrays of light emitting devices and inner arrays of light emitting devices;
initiating scanning of the bound document;
activating the outer arrays to emit light from the light source to illuminate the bound document, the outer arrays are activated during the entire scanning operation;
while scanning, continuously monitoring and measuring distance between the bound document and a contact image sensor, to detect the curved region;
upon detection of the curved region, generating a control command to increase the intensity of the light source at or along the curved region;
in addition to the activated outer arrays, activating the inner arrays to increase the intensity of the light source to be emitted in the curved region of the bound document, wherein the inner arrays are activated only when the curved region is detected;
deactivating the inner arrays of light emitting devices when an end of the curved region is detected;
receiving light reflected from the bound document to capture a complete image of the bound document; and
generating a digital version of the bound document.

20. The method of claim 19, further comprising activating one or more groups of light emitting device of the inner arrays.

21. The method of claim 19, further comprising activating individual light emitting devices of the inner arrays.

22. A light source for scanning a bound document, wherein the bound document having a flat region and a curved region, comprising:
outer arrays having a plurality of light emitting devices, wherein the outer arrays are activated during the entire scanning operation of a bound document; and
inner arrays having a plurality of light emitting devices, wherein the inner arrays are activated only during scanning of the curved region of the bound document, wherein the inner arrays are activated to increase intensity of light in the curved region of the bound document in order to increase the reach through the curved region of the bound document, and wherein the inner arrays are deactivated when an end of the curved region is detected.

* * * * *